(12) United States Patent
Liang et al.

(10) Patent No.: US 12,125,240 B2
(45) Date of Patent: Oct. 22, 2024

(54) CAMERA CALIBRATION METHOD

(71) Applicant: Hong Kong Applied Science And Technology Research Institute Co., Ltd., Shatin (HK)

(72) Inventors: Yao Cheng Liang, Shatin (HK); Ho Man Cheng, Shatin (HK); Ka Ho Mui, Wong Tai Sin (HK)

(73) Assignee: Hong Kong Applied Science And Technology Research Institute Co., Ltd, Shatin (HK)

( * ) Notice: Subject to any disclaimer, the term of this patent is extended or adjusted under 35 U.S.C. 154(b) by 568 days.

(21) Appl. No.: 17/467,683

(22) Filed: Sep. 7, 2021

(65) Prior Publication Data

US 2023/0083307 A1    Mar. 16, 2023

(51) Int. Cl.
*G06T 7/80* (2017.01)
*G06T 7/73* (2017.01)
(52) U.S. Cl.
CPC .............. *G06T 7/80* (2017.01); *G06T 7/74* (2017.01); *G06T 2207/30236* (2013.01)
(58) Field of Classification Search
CPC .... G06T 7/80; G06T 7/74; G06T 2207/30236
See application file for complete search history.

(56) References Cited

U.S. PATENT DOCUMENTS

| | | | |
|---|---|---|---|
| 2016/0180535 A1 | 6/2016 | Zalmanson et al. | |
| 2019/0147647 A1 | 5/2019 | Rudin et al. | |
| 2019/0266396 A1 | 8/2019 | Greveson et al. | |
| 2021/0158567 A1* | 5/2021 | Dai | ..................... G01C 21/3658 |
| 2021/0350572 A1* | 11/2021 | Wang | ........................ G06T 7/20 |
| 2022/0366606 A1* | 11/2022 | Ma | ............................ G06T 7/80 |

FOREIGN PATENT DOCUMENTS

| | | |
|---|---|---|
| CN | 104081433 A | 10/2014 |
| CN | 104809718 A | 7/2015 |
| CN | 108761475 A | 11/2018 |
| CN | 111046762 A | 4/2020 |
| CN | 111461994 A | 7/2020 |
| CN | 112116655 A | 12/2020 |
| CN | 112446898 A | 3/2021 |

* cited by examiner

*Primary Examiner* — Molly Wilburn
(74) *Attorney, Agent, or Firm* — GableGotwals

(57) ABSTRACT

Described is a method of calibrating a camera. The method comprises defining an area observed in a field of view (FOV) of the camera as a region of interest (ROI). The method includes selecting a plurality of physical reference points in said ROI and obtaining for each reference point physical position coordinates. The method also includes obtaining from said camera FOV or camera image data pixel locations for each point of reference and pairing each pixel location with the physical position coordinates of its respective reference point. Then, a relationship is derived from the paired pixel locations and physical position coordinates to enable a selected or identified pixel location in the camera FOV or camera image data to be transformed to physical position coordinates for a corresponding physical location in said ROI.

16 Claims, 5 Drawing Sheets

CAMERA CALIBRATION METHOD

FIELD OF THE INVENTION

The invention relates to a camera calibration method to obtain physical position coordinates for objects within an image view or field of view (FOV) of the camera or in an image captured by the camera.

BACKGROUND OF THE INVENTION

Cameras are widely installed for performing different kinds of smart city applications, for example, human/vehicle tracking, generating traffic statistics, vehicle speed detection, etc. Visual positioning is a technology that can provide locations of objects in an area or region of interest by using roadside camera image views or images captured by such cameras. Many applications, such as autonomous vehicle control and automatic vehicle parking, etc., can be further developed using detected locations of objects in the area of interest. Increasing positioning accuracy and decreasing cost is enhancing the demand for such visual positioning systems, especially in smart city environments. However, known camera calibration algorithms can be difficult to implement and time consuming with poor accuracy in determining position coordinates for observed objects.

In the field of visual positioning, depth cameras are often employed but many known depth cameras have very limited range of 20 m or less. Visual positioning technology is a key technology of cellular vehicle to everything (C-V2X) systems and networks but a C-V2X system typically requires at least about 100 m depth coverage from the traffic surveillance cameras.

There are, of course, millions of traffic system surveillance cameras already installed which could be integrated into smart city systems if suitably adapted. One problem encountered with such surveillance cameras is that they are often mounted at heights in the order of 6 to 8 metres above road level such that it is difficult to manually calibrate such cameras using conventional camera calibration methods.

CN111461994 discloses a method for acquiring a coordinate transformation matrix and determining the coordinate position of an object in a camera FOV, the method comprising controlling the camera to move to a pre-set position, selecting one reference point in the FOV, measuring its coordinate position, and then pairing it with its corresponding pixel location in the camera FOV. By taking the coordinate position data for the projection location point of the camera and coordinate position data for the reference point, it is possible to establish a coordinate system for locations within the camera FOV. However, it is necessary to also obtain the camera's coordinate position to derive the coordinate transformation matrix.

US2019/0147647 discloses a method of determining global positioning system (GPS) coordinates of some image point(s) positions in at least two images using a processor configured by program instructions. The method includes receiving position information of some of the positions where an image capture device has captured an image. The method includes determining geometry by triangulating various registration objects in the images and determining GPS coordinates of the image point(s) positions in at least one of the images.

US2016/0180535 discloses a method of georeferencing a first image of a scene acquired from a first imaging device based on at least one second image of the scene acquired from a second imaging device. The method includes obtaining data indicative of an eligibility parameter for one or more areas of the scene; selecting one or more pivot areas among the one or more areas of the scene, wherein the eligibility parameter of the pivot areas satisfy a predefined criterion; for at least some of the selected pivot areas, identifying tie points for the first and second images; and solving the external orientation of the first image using the identified tie points and a first imaging device model.

US2019/0266396 discloses an apparatus including an interface configured to receive image data and position data from an aircraft. The image data is associated with a plurality of images of a scene including an object. The position data is associated with positions of a camera of the aircraft that captured the plurality of images. The apparatus further includes a processor configured to identify a first camera position corresponding to a first image of the plurality of images. The processor further configured to identify a first relative position of the object relative to the camera. The first relative position identified based on the first camera position, the first image data, and second image data corresponding to a second image of the plurality of images. The processor further configured to output an indication of a global position of the object based on the position data and the first relative position of the object.

What is desired is an improved camera calibration method to obtain physical position coordinates for objects in a region of interest (ROI) within the camera's FOV with high accuracy.

Objects of the Invention

An object of the invention is to mitigate or obviate to some degree one or more problems associated with known methods of camera calibration for determining objects' physical positions within a camera's FOV.

The above object is met by the combination of features of the main claims; the sub-claims disclose further advantageous embodiments of the invention.

Another object of the invention is to provide a novel camera.

Another object of the invention is to provide a method of obtaining absolute position coordinates for objects in an image view, i.e., FOV, of a camera.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a method of calibrating a camera having a defined or selected region or area of interest (ROI) comprising an area or a portion of an area observed in a field of view (FOV) of the camera, the method comprising selecting a plurality of physical reference points in said ROT and obtaining for each reference point physical position coordinates. The method also includes obtaining from said camera FOV or camera image data pixel locations for each point of reference and pairing each pixel location with the physical position coordinates of its respective reference point. Then, a relationship is derived from the paired pixel locations and physical position coordinates to enable a selected or identified pixel location in the camera FOV or camera image data to be transformed to respective physical position coordinates for a corresponding physical location in said ROI.

In a second main aspect, the invention provides a camera comprising: a memory storing machine-readable instructions and a processor for executing the machine-readable instructions such that, when the processor executes the machine-readable instructions, it configures the camera to: define an area observed in a field of view (FOV) of the camera as a region of interest (ROI); receive physical position coordinates for a plurality of physical reference points in said ROI; obtain from said camera FOV or camera image data pixel locations for each point of reference; pair each pixel location with the physical position coordinates of its respective reference point; and derive a relationship from the paired pixel locations and physical position coordinates to enable a selected or identified pixel location in the camera FOV or camera image data to be transformed to physical position coordinates for a corresponding physical location in said ROI.

In a third main aspect, the invention provides a method of method of determining physical position coordinates for a pixel location in a field of view (FOV) of a camera or in camera image data, the method comprising: identifying or selecting a pixel location in the FOV or camera image data; and transforming said identified or selected pixel location to physical position coordinates for a corresponding physical location in a region of interest (ROI), said ROI comprising an area observed by the camera in its FOV; wherein said transformation is based on a relationship derived from paired pixel locations and measured physical position coordinates for a plurality of reference points in the ROI.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the an that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
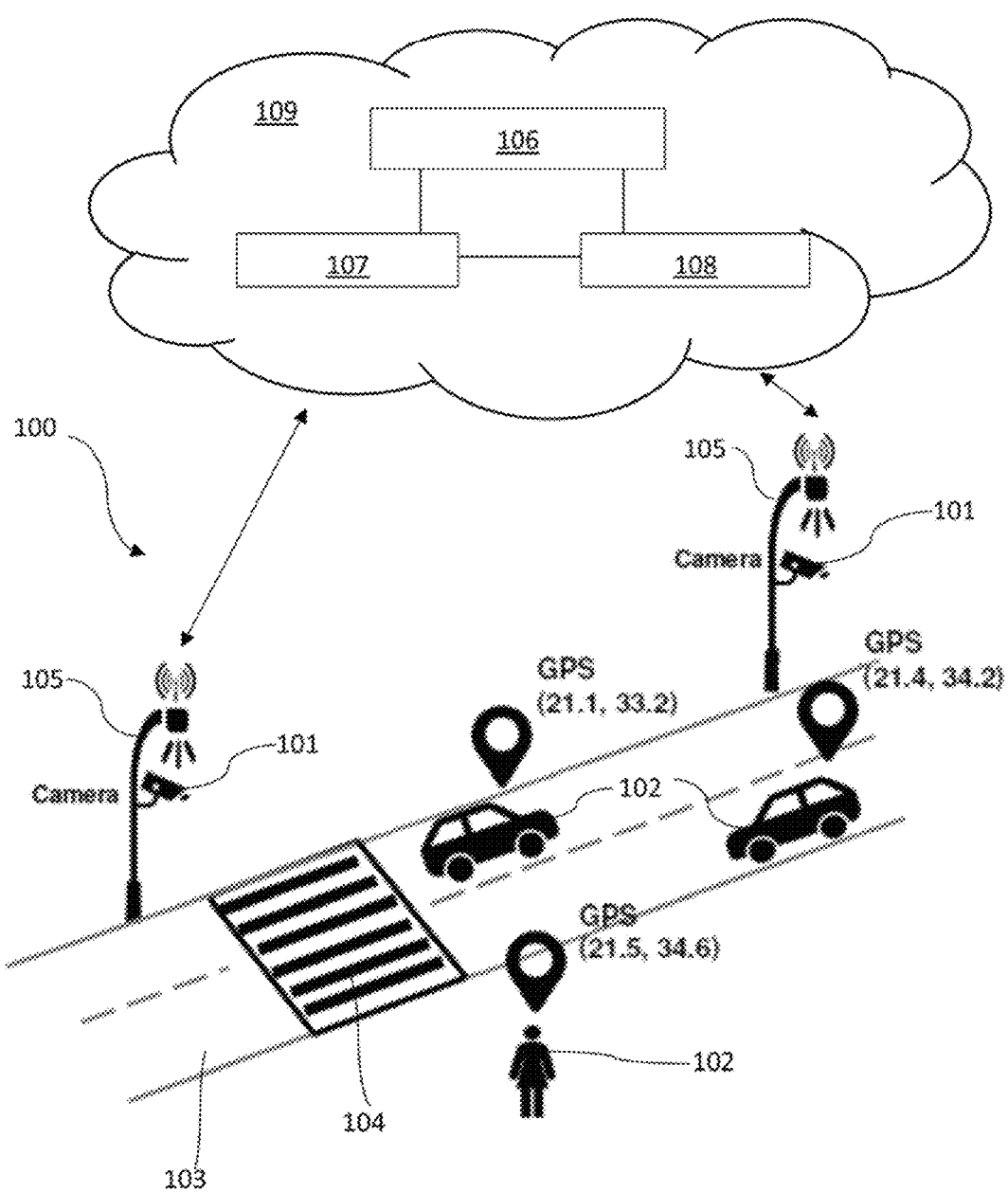
FIG. 1 is a block schematic diagram of a smart city scene in which cameras in accordance with the invention can implement the methods of the invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS, may be implemented in various forms of hardware, software, or combinations thereof. These elements may be implemented in a combination of hardware and software on one or more appropriately programmed general-purpose devices, which may include a processor, a memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode, or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

One of the most common sensors used in smart city developments are surveillance cameras. Millions of such cameras are being installed in cities and towns worldwide to perform functions such as human/vehicle tracking and positioning, speed detection, providing data to vehicles and pedestrians though suitably enabled electronic devices, providing data to central control systems, etc. Such surveillance cameras can be usefully used to assist in traffic control and policing, pedestrian safely, and automatic vehicle parking to identify but a few of their functions. However, some of these functions require the vehicle and/or pedestrian position data to be highly accurate within a frame of reference. In many existing systems, the camera relative frame of reference providing position data for vehicles and/or pedestrians which are relative to the position of the camera rather than absolute position data such as global position system geographical coordinates. The usefulness of such surveillance cameras is greatly enhanced if they are adapted to provide absolute position data for vehicles and/or pedestrians or for any objects falling within the view of the camera.

One of the difficulties in achieving the aforesaid objective is the difficulty of calibrating such a camera to provide absolute position data for objects in the camera image view.

In one of its main aspects, the present invention provides a novel and simple method for calibrating the relationship between a real-world coordinate system in the locality of the camera with an absolute coordinate system such as a three-dimensional geographical coordinate system. This in turn enables a 2D pixel coordinate system of the camera image view to be calibrated to three-dimensional geographical coordinate system, i.e., an absolute positioning system.

The method may include calibrating one or both of the intrinsic characteristics of the camera and the extrinsic characteristics of the camera if these are not already known.

Furthermore, the method may include verifying the calibration results using a novel and simple method requiring nothing more than the same tools used for the main calibration step of the method.

The main aim of the method of the first main aspect of the invention is to transform the 2D pixel coordinate system of the camera image view into the 3D geographical coordinate system for any selected point locations within the image view of the camera.

FIG. 1 comprises a smart city scene 100 in which one or more cameras 101 are suitably enabled in accordance with the invention to capture and provide image data from which physical position data, and preferably absolute position data, e.g., GPS data or the like, for objects of interest 102 within the camera views can be obtained. Each camera 101 has a specified camera view, e.g., field of view (FOV) of a part of the city scene 100, which in this instance comprises a highway 103 with a pedestrian crossing 104.

In the example of FIG. 1, the cameras 101 are mounted on street-lamps 105 but it will be understood that the cameras 101 could be mounted on any suitable structures including buildings, etc. The camera views may overlap although this is not essential. Each camera 101 is adapted to obtain image data of its respective camera image view from which physical position data can be obtained for the objects 102 located within the camera's image view. Each camera 101 may be enabled with object recognition software to enable it to recognize and classify objects 102 within its camera view but that is not the focus of the present invention. Each camera 101 is preferably enabled to select a point location on each object 102 within its camera view for which absolute position data can be obtained from the camera image data. Preferably, point locations are selected at the base of an end of an object 102 nearest the camera 101 and centrally of said object's base, the absolute position data for said selected point location represents the physical location of the object 102 within the camera's FOV and, more particularly, within a defined or selected region of interest (ROI) within the camera's FOV.

Each camera 101 may be enabled to determine by itself the physical position data for each object 102 within the defined or selected ROT and to report said data to other entities in the smart city system such as reporting said data to vehicle based electronic devices, pedestrian handheld electronic devices, other system sensors including other cameras 101, system gateways (not shown) and one or more system central controllers 106. Additionally, or alternatively, the cameras 101 may each be linked to a system server 107 and a database 108 by a suitable communication network 109 such as a C-V2X network with the cameras 101 being enabled to provide camera image data to the server 107 and/or the database 108. The server 107 may be configured to determine the physical position data for objects 102 within the cameras' ROIs from camera image data provided by the various cameras 101, to store said physical position data in the database 108, and to communicate said physical position data as required to the other smart city system entities.

Figure 2:
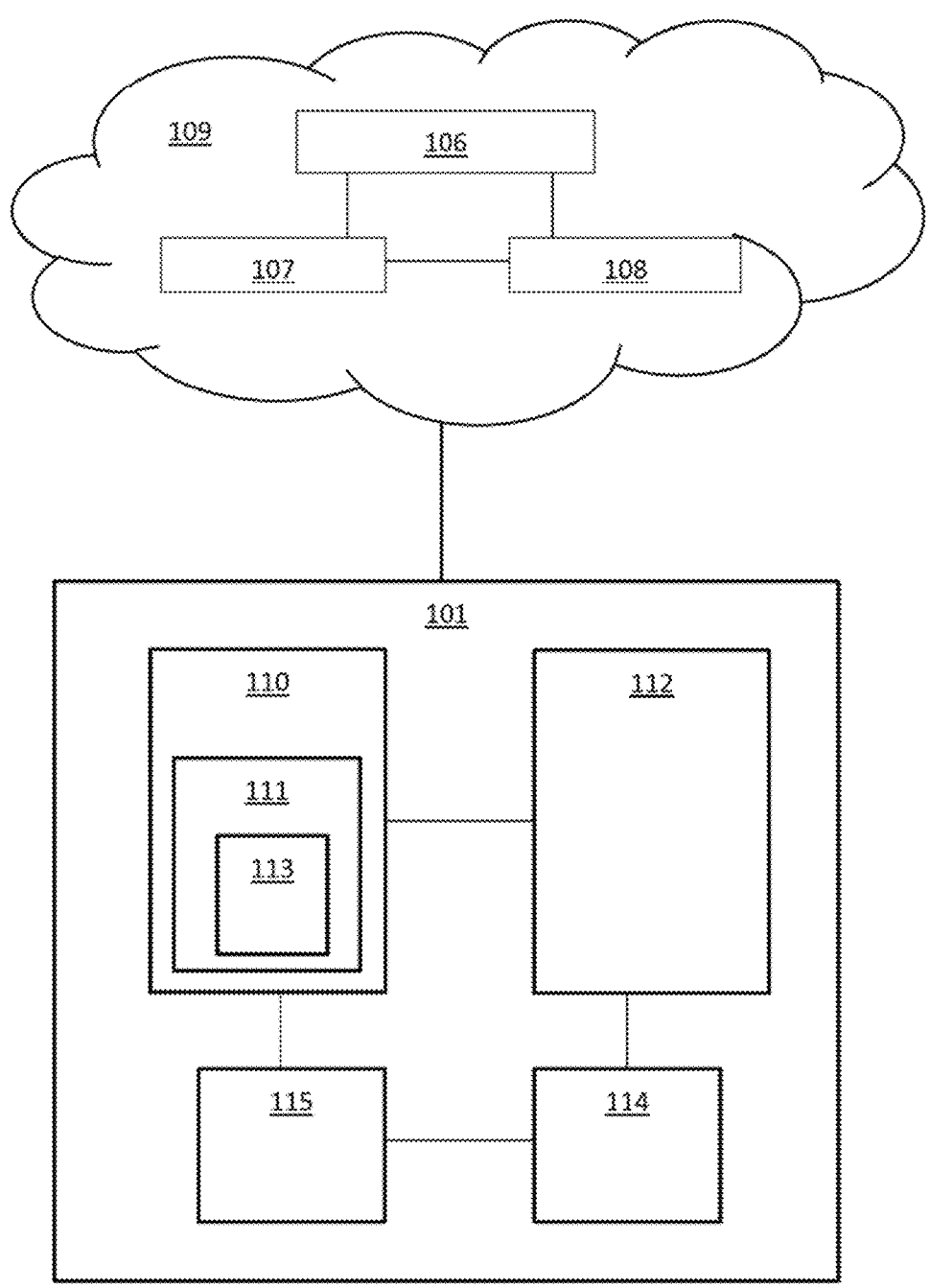
FIG. 2 is a schematic block diagram of an improved camera in accordance with the invention.

FIG. 2 shows an exemplary embodiment of an improved camera 101 in accordance with concepts of the present invention. In the illustrated embodiment, the camera 101 may include communication equipment 110 such as a network node, a network card, or a network circuit, etc. operating in, for example, a 5G communications system environment and/or a C-V2X network environment, although the improved camera 101 of the invention is not limited to operating in such network environments but could include communication equipment 110 for operating in any suitable communications network 109.

The camera 101 may comprise a plurality of functional blocks for performing various functions thereof. For example, the camera 101 may include a transceiver module 111 for transmitting and receiving data signals from other smart city system entities. The transceiver module 111 provides signal processing and is configured to provide signals and/or information extracted therefrom to functional block module(s) 112 such as may comprise various data sink, control element(s), user interface(s), etc. Irrespective of the particular configuration of the transceiver module 111, embodiments include data processing module 113 which may be disposed in association with the transceiver module 111 for facilitating accurate processing of data in accordance with the invention.

Although the data processing module 113 is shown as being deployed as part of the transceiver module 111 (e.g., comprising a portion of the transceiver module control and logic circuits), there is no limitation to such a deployment configuration according to the concepts of the invention. For example, the data processing module 113 may be deployed as a separate functional block of the camera 101 that is distinct from, but connected to, the transceiver module 111. The data processing module 113 may, for example, be implemented using logic circuits and/or executable code/machine readable instructions stored in a memory 114 of the camera 101 for execution by a processor 115 to thereby perform functions as described herein. For example, the executable code/machine readable instructions may be stored in one or more memories 114 (e.g., random access memory (RAM), read only memory (ROM), flash memory, magnetic memory, optical memory, or the like) suitable for storing one or more instruction sets (e.g., application software, firmware, operating system, applets, and/or the like), data (e.g., configuration parameters, operating parameters and/or thresholds, collected data, processed data, and/or the like), etc. The one or more memories 114 may comprise processor-readable memories for use with respect to one or more processors 115 operable to execute code segments of data processing module 113 and/or utilize data provided thereby to perform functions of the data processing module 113 as described herein. Additionally, or alternatively, the data processing module 113 may comprise one or more special purpose processors (e.g., application specific integrated circuit (ASIC), field programmable gate array (FPGA), graphics processing unit (GPU), and/or the like configured to perform functions of the data processing module 113 as described herein.

Figure 3:
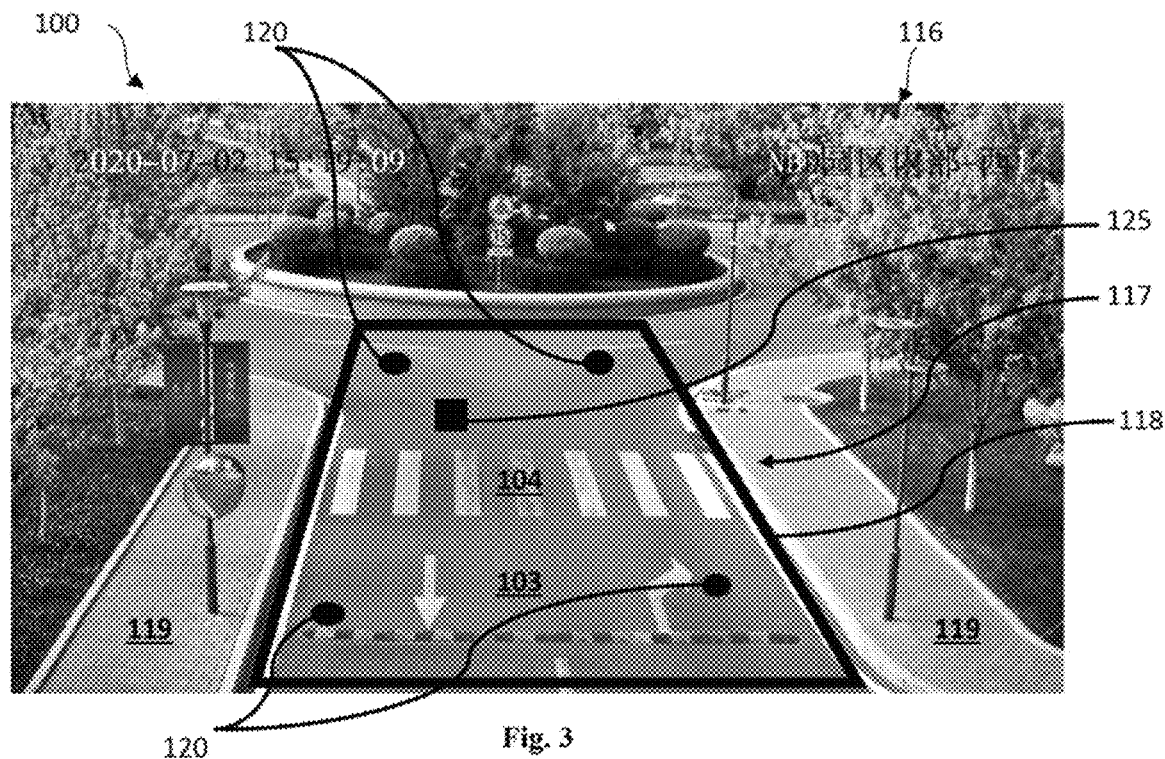
FIG. 3 is an illustration of a region of interest (ROI) in a field of view (FOV) of a camera in accordance with the invention.

FIG. 3 shows another smart city scene 100 from a perspective of the camera 101 (not shown) where the image 116 of FIG. 3 comprises the FOV or image view of the camera 101. Preferably, the camera 101 has a fixed FOV, i.e., the camera 101 is not enabled to change its FOV. The camera 101 may be configured to autonomously select or define a ROI 117 within its FOV using object recognition software. Alternatively, the camera 101 may be configured such that an operator can manually define or select the ROI 117 within the camera's FOV. The camera 101 may be configured to enable an operator to remotely connect with the camera 101 via the communications network 109 to define or select the ROI 117 and/or to make other adjustments to the camera 101.

The ROI 117 preferably comprises a part of the camera's FOV in which it is desired to detect, monitor, measure, track, alert, message and/or manage objects of interest 102. The objects of interest 102 may comprise any of vehicles and pedestrians and, in some embodiments, even animals where animal ingress onto highways 103 may create dangers for road users.

In FIG. 3, the ROI 117 is demarcated by a window 118 superimposed on the camera's FOV. Although the ROI 117 in this example excludes the pedestrian pavements or walkways 119 (but includes the pedestrian crossing 114 across the highway 103) it will be understood that the ROI 117 may include the pedestrian pavements or walkways 119 especially where pedestrians have developed a habit of crossing the highway 103 at non-official crossing points.

The window 118 demarcating the ROI 117 in FIG. 3 may be provided as a visual tool to enable an operator to easily and quickly define or select the extent of the ROI 117 within the camera's FOV but it will be appreciated that other suitable means of autonomously or manually defining or selecting the ROI 117 may be utilized. The ROT 117 may be established for the camera 101 at a separate point in time from remaining steps of the method of calibrating the camera 101 hereinafter described. In other words, the camera 101 may already have an established ROI 117 and the method of calibrating the camera 101 in accordance with the invention may not require the initial step of selecting or defining the ROI 117 at that time.

The ROI 117 is based on the observation that most ROIs in traffic surveillance systems, which typically comprise an observed portion of a highway 103, can be represented or approximated by a plane, i.e., a flat two-dimensional (2D) surface. In C-V2X traffic surveillance and/or management systems, it is important to obtain accurate physical location data for objects of interest 102 within the ROIs 117. The invention provides a simple and efficient method of calibrating the traffic surveillance cameras 101 to relate pixel positions in the camera's FOV and, more particularly, in the defined or selected ROI 117 of the camera 101, to physical location coordinates and preferably to absolute location coordinates. Once the camera 101 is calibrated in accordance with the invention, the camera 101 and/or the server 107 can autonomously determine absolute location coordinates for objects of interest 102 within the camera's ROI 117.

The method of the invention involves selecting a plurality of physical reference points 120 in said ROI 117 and obtaining for each reference point 120 respective physical position data. It will be appreciated that the size of the reference points 120 in FIG. 3 are not to scale but are exaggerated in size for ease of depiction. Whilst it is preferred that the physical position data for the reference points 120 comprises absolute position data such as GPS coordinates or the like, the methods of the invention can be employed where GPS or similar data is not available. In such a case, the physical position data can comprise coordinate data from a local or relative frame of reference for the camera 101 such as a local cartesian reference frame.

It is preferred that at least four reference points 120 in said ROI 117 are selected but as many as twenty or thirty reference points 120 in said ROI 117 may be chosen. The reference points 120 should be selected such that they are clearly visible within the camera's FOV and/or image data and located within the ROI 117. Furthermore, the reference points 120 should preferably be evenly distributed throughout the ROI 117, preferably be spaced apart from each other as much as possible, and preferably not lie on the same line or lines.

Figure 4:
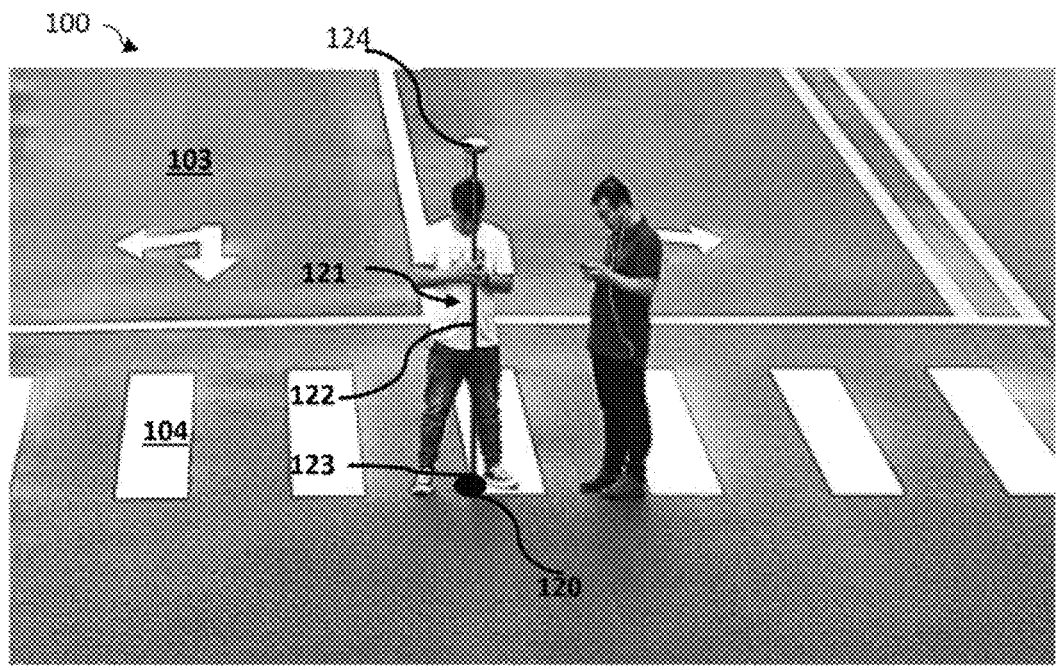
FIG. 4 is an enlarged portion of an image captured by the camera in accordance with the invention illustrating measurement of a point of reference.

The method may include causing the camera 101 to capture a separate image of each reference point 120 in the ROI 117 when it is being physically measured to obtain its physical position data as illustrated by FIG. 4 which shows an enlarged portion of the captured image for one of the reference points 120 (also shown not to scale). In this example, a visual aid 121 comprising a stick 122 with a visible tip 123 may be used to select or identify the reference point 120. The tip 123 of the stick 122 identifies the reference point 120. The tip 123 of the stick 122 may be arranged to have enhanced visibility. Usefully, the stick 122 can be adapted to carry a physical location measuring device 124 which preferably comprises a real-time kinematic (RTK) positioning apparatus or the like for obtaining global position coordinate data for the reference point 120. Additionally, or alternatively, in some embodiments, marker devices 125 (FIG. 3, also shown not to scale) may be placed at some or each reference point 120 as visual aids. The global position coordinate data may comprise World Geodetic System 1984 (WGS84) absolute coordinate data or Hong Kong 1980 Geodetic system (HK80) absolute coordinate data but any absolute coordinate data system may be utilized.

In a next step, the method of calibrating the camera 101 involves obtaining from said camera FOV or camera image data camera FOV or image pixel locations for each point of reference 120. This preferably includes obtaining the pixel location of the visual aid 121/125 at the reference point 120 such as obtaining the pixel location of the tip 123 of the stick 122 where it touches the surface of the highway 103, for example as seen in FIG. 4. It has been found that using a visual aid 121 or visual aids 125 in demarcating the reference point(s) 120 considerably improves accuracy of the pixel location data for said reference point(s) 120.

Figure 5:
FIG. 5 is an illustration of determining pixel coordinates for a point location in the camera's FOV or camera image data.

Obtaining the pixel location, i.e., pixel coordinates, of the reference points 120 from the camera image view (FOV) or camera image data may be implemented or at least assisted by using an image viewer tool. An example of such a tool is the GNU Image Manipulation Program (GIMP™) which comprises a cross-platform image editor. Using such a tool, an operator is able to move a screen cursor over a displayed image of the ROI 117 to hover the cursor over each reference point 120. The tool will display the pixel location of the reference point 120 at which the cursor is presently placed in the displayed image. An operator may obtain access to the camera FOV or image data via a direct connection to the camera 101 over the network 109 and/or via the server/database 107/108. Another method of obtaining the pixel coordinates of the reference points 120 from the camera image view (FOV) or camera image data is to use an object detector tool. An example of such a tool is the 'You Only Look Once' (YOLO™) real-time object detection algorithm which, as illustrated in FIG. 5, identifies objects of interest 102 in a smart city scene 100 and wraps the identified object 102 with a bounding box 126. Any point 127 on the bounding box 126 may be selected as the pixel coordinate position in the camera's FOV or camera image data for the object of interest 102. Whilst FIG. 5 shows the YOLO™ algorithm identifying objects of interest 102, it will be understood that the algorithm can be configured to identify the reference points 120. In such a case, the visual aid such as the stick 122 proves useful as a means of using the YOLO™ algorithm to autonomously identify the reference points and provide the pixel coordinates for the reference points 120. As shown in FIG. 5, it is preferred that the point 127 on the bounding box 126 selected as the pixel coordinate position for an object of interest 102 or for a reference point 120 is positioned at the base of the bounding box 126 and central of said base. Another example of a suitable tool for object 102 and reference point 120 detection comprises a single-shot detector (SSD) algorithm.

Figure 6:
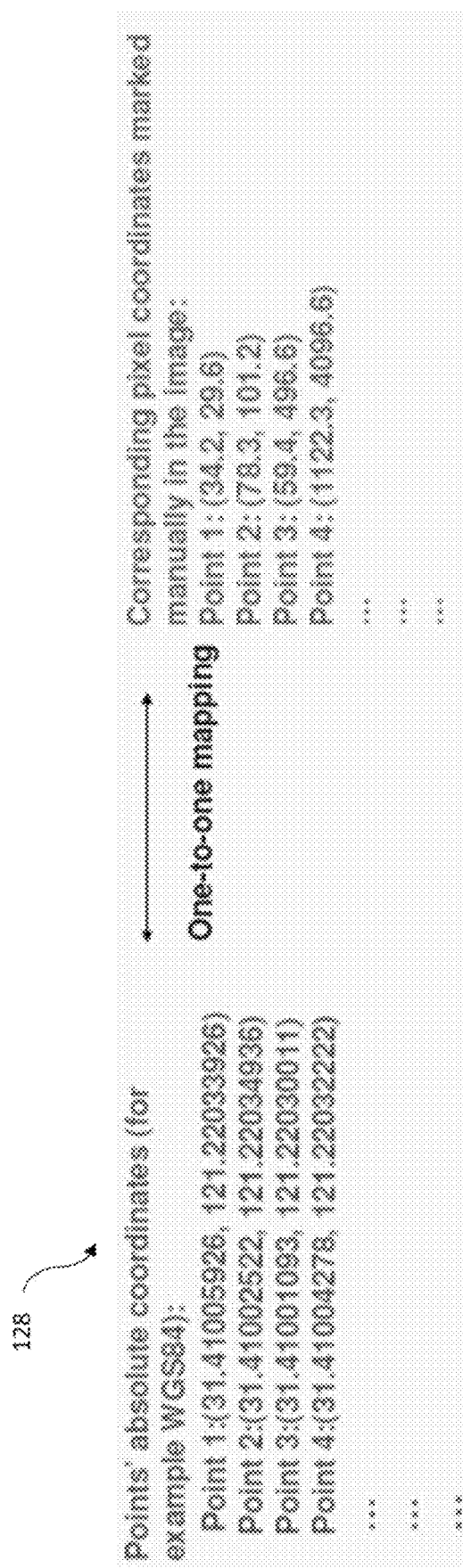
FIG. 6 is an example of the set of all paired pixel coordinates and physical position coordinates for the plurality of reference points in accordance with the invention.

Once the pixel coordinates for the plurality of reference points 120 have been obtained, the pixel coordinates for each reference point 120 are paired with the respective physical location data for that reference point 120. This provides a set 128 (FIG. 6) of all paired pixel coordinates and physical position coordinates for the plurality of reference points 120. FIG. 6 illustrates an example of the set 128 of all paired pixel coordinates and physical position coordinates for the plurality of reference points 120. The set 128 of all paired pixel coordinates and physical position coordinates for the plurality of reference points 120 is preferably saved to the memory 114 of the camera 101 and/or to the server/database 107/108.

The method includes deriving a relationship from the set 128 of all paired pixel coordinates and physical position coordinates to enable a subsequently selected or identified pixel location in the camera FOV or camera image data to be transformed to respective physical position coordinates for a corresponding physical location in said ROI 117.

The derived relationship may comprise a trigonometrical relationship between said paired pixel coordinates and physical position coordinates for the plurality of reference points 120. However, it is preferred to a derive a homography matrix for transforming a subsequently selected or identified pixel location in the camera FOV or camera image data to respective physical position coordinates for a corresponding physical location in said ROI 117.

Figure 7:
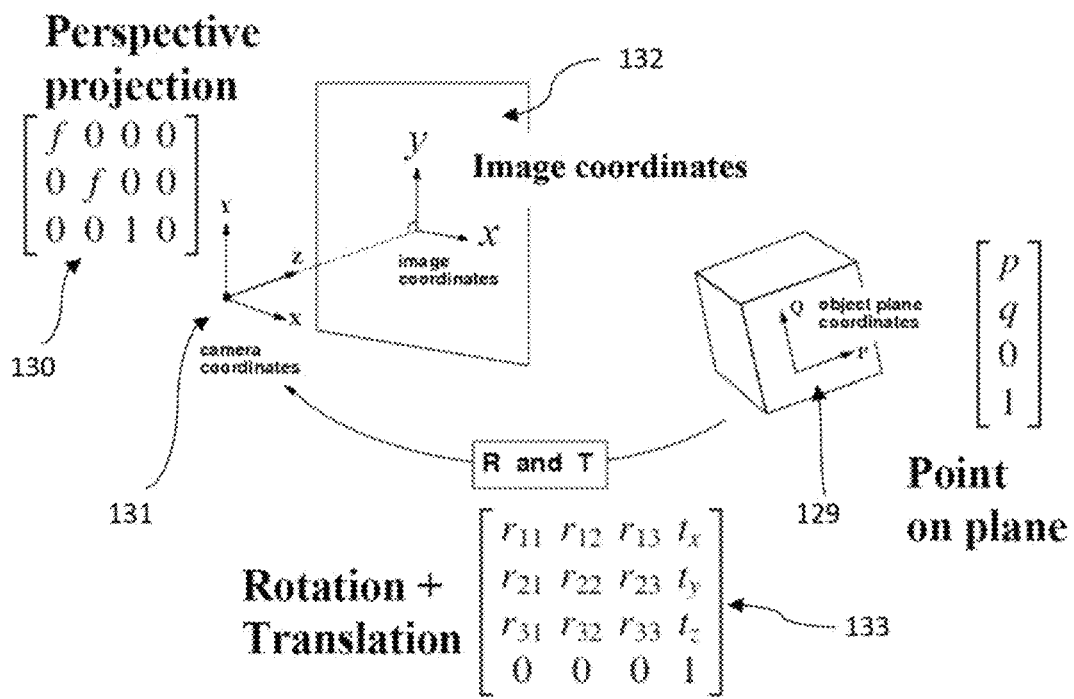
FIG. 7 illustrates the transformation matrices for a 3D space to a 2D pixel coordinate system of the camera in accordance with the invention.

FIG. 7 illustrates the relationship between a point [p, q, 0. 1] on a plane in a 3D space 129 to a pixel location [x, y, 1] in 2D camera FOV or camera image data. Here, the plane in the 3D space 129 is defined by coordinates P, Q. The plane in the 3D space 129 is akin to the ROI 117. The perspective projection matrix 129 represents a projective transformation from the camera 3D coordinate system [x, y, z] 131 to the camera 2D image pixel coordinate system [x, y, 1] 132 and vice-versa. The perspective projection matrix 130 represents the intrinsic characteristics of the camera 101. To transform a location [p, q, 0. 1] on the plane in the 3D space 129 to an image pixel location also requires a rotation and translation matrix 133 which represents the extrinsic characteristics of the camera 101. The rotation and translation matrix 133 defines the relationship between the 3D space 129 and the camera 3D coordinate system [x, y, z] 131.

The transformation of an image pixel location [x, y, 1] to a location [p, q, 0. 1] on the plane in the 3D space 129, and vice-versa, is given by:

$$\begin{bmatrix} x \\ y \\ 1 \end{bmatrix} \sim \begin{bmatrix} f & 0 & 0 & 0 \\ 0 & f & 0 & 0 \\ 0 & 0 & 1 & 0 \end{bmatrix} \begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix} \begin{bmatrix} p \\ q \\ 0 \\ 1 \end{bmatrix}$$

However, as the location [p, q, 0. 1] is in a 2D plane, the transformation can be rewritten as:

$$\begin{bmatrix} x \\ y \\ 1 \end{bmatrix} \sim \begin{bmatrix} f & 0 & 0 & 0 \\ 0 & f & 0 & 0 \\ 0 & 0 & 1 & 0 \end{bmatrix} \begin{bmatrix} r_{11} & r_{12} & t_x \\ r_{21} & r_{22} & t_y \\ r_{31} & r_{32} & t_z \\ 0 & 0 & 1 \end{bmatrix} \begin{bmatrix} p \\ q \\ 1 \end{bmatrix}$$

This can be further simplified to:

$$\begin{bmatrix} x \\ y \\ 1 \end{bmatrix} \sim \begin{bmatrix} f & 0 & 0 \\ 0 & f & 0 \\ 0 & 0 & 1 \end{bmatrix} \begin{bmatrix} r_{11} & r_{12} & t_x \\ r_{21} & r_{22} & t_y \\ r_{31} & r_{32} & t_z \end{bmatrix} \begin{bmatrix} p \\ q \\ 1 \end{bmatrix}.$$

The homography matrix required for the preferred method of the invention comprises a product of the simplified perspective projection matrix and the simplified rotation and translation matrix:

$$\begin{bmatrix} x \\ y \\ 1 \end{bmatrix} \sim \begin{bmatrix} fr_{11} & fr_{12} & ft_x \\ fr_{21} & fr_{22} & ft_y \\ r_{31} & r_{32} & t_z \end{bmatrix} \begin{bmatrix} p \\ q \\ 1 \end{bmatrix}.$$

This can be rewritten as:

$$\begin{bmatrix} x \\ y \\ 1 \end{bmatrix} \sim \begin{bmatrix} h_{11} & h_{12} & h_{13} \\ h_{21} & h_{22} & h_{23} \\ h_{31} & h_{32} & h_{33} \end{bmatrix} \begin{bmatrix} p \\ q \\ 1 \end{bmatrix}.$$

The homography matrix comprises a 3 by 3 planar projective transformation matrix because, for a planar surface in a 3D space, it reduces to a 2D-to-2D transformation matrix which is invertible.

If a physical reference point 120 or a point location of an object of interest 102 in the camera FOV is represented as [x1, y1, 1] and the corresponding pixel coordinate location in the camera FOV or camera image data is represented as [x2, y2, 1] then the reversible transformation of the physical location of the reference point 120 or object of interest 102 to the image pixel location can be provided by:

$$\begin{bmatrix} x_1 \\ y_1 \\ 1 \end{bmatrix} = H \begin{bmatrix} x_2 \\ y_2 \\ 1 \end{bmatrix} = \begin{bmatrix} h_{00} & h_{01} & h_{02} \\ h_{10} & h_{11} & h_{12} \\ h_{20} & h_{21} & 1 \end{bmatrix} \begin{bmatrix} x_2 \\ y_2 \\ 1 \end{bmatrix}$$

where H is the 3 by 3 homography matrix and the matrix H is such that the lower right elements equals "1".

It can be seen therefore that the resultant homography matrix H has eight unknown parameters but these can be determined from known or measured physical location coordinates and their corresponding image pixel coordinates. In other words, the unknown parameters in the homography matrix H required for the preferred method of the invention can be resolved from four paired pixel locations and physical position coordinates. It is therefore only necessary to obtain the physical location data and corresponding image pixel locations of four reference points 120 in the ROI 117 to obtain the necessary homography matrix H for transforming a subsequently selected or identified pixel location in the camera FOV or camera image data to respective physical position coordinates for a corresponding physical location in said ROI 117. For ease of description, the foregoing disregards camera lens distortion, but such distortion can be accounted for by known methods in the camera intrinsic and extrinsic characteristics.

Whilst it is only necessary to obtain the physical location data and corresponding pixel locations of four reference points 120, it is preferred to obtain paired pixel locations and physical position coordinates for up to twenty reference points 120 and even up to thirty reference points 120 in some embodiments. This is because the invention preferably includes, prior to the step of deriving the homography matrix H, the steps of selecting a subset of four or more paired pixel locations and physical position coordinates from the set 128 of all paired pixel locations and physical position coordinates and then deriving a screening homography matrix from said subset. Preferably, the method includes only choosing for said subset paired pixel locations and physical position coordinates which are known or determined to comprise inliers. The screening homography matrix is used to determine if each remaining paired pixel location and physical position coordinates in the set 128 of all paired pixel locations and physical position coordinates comprises an outlier. If any of said remaining paired pixel location and physical position coordinates is determined to be an outlier then it is removed from the set 128 of all paired pixel location and physical position coordinates. Once the set 128 of all paired pixel location and physical position coordinates has been processed to remove any outliers, the homography matrix H is derived from the cleaned set of all paired pixel location and physical position coordinates. The method of removing outliers from the set 128 of all paired pixel location and physical position coordinates may include using a predetermined, selected, or calculated threshold to separate outliers from inliers where inliers comprise paired pixel location and physical position coordinates meeting the threshold and which are not then removed from the set 128 of all paired pixel location and physical position coordinates. The method of deriving or calculating the homography matrix H preferably comprises a least squares method which minimizes reprojection errors amongst the inliers. Reprojection errors may be calculated from the absolute coordinate data for the reference points 120 and more particularly from the global latitude and longitude data for each reference point 120.

It will be understood that any suitable method of removing outliers from a data set may be utilized. An example of a suitable tool for removing outliers comprises the OpenCV™ application programming interface (API). Another example of a tool for removing outliers comprises a random sample consensus (RANSAC) algorithm.

A method of obtaining the physical location coordinates for an object of interest 102 in the ROI 117 may comprise multiplying the homography matrix H with the object's pixel coordinates in a homogenous coordinate format:

$$\begin{bmatrix} U \\ V \\ W \end{bmatrix} = H \begin{bmatrix} X \\ Y \\ 1 \end{bmatrix}$$

and then obtaining the object's physical location coordinates by converting the result of the above multiplication into a homogenous coordinate format:

$$\begin{bmatrix} Px \\ Py \\ 1 \end{bmatrix} = \begin{bmatrix} U/W \\ V/W \\ 1 \end{bmatrix}.$$

The camera 101 may comprise a monocular, RGB camera with resolution less than 2K.

The camera 101 is preferably an already installed camera where conventional camera calibration methods are difficult to implement because of the installed location of the camera.

The method of the invention is reversible in that it is possible to identify a physical location in the ROI 117 and obtain for said location the corresponding pixel coordinates in the camera's FOV or camera image data.

The present invention also provides a camera 101 comprising: a memory 114 storing machine-readable instructions and a processor 115 for executing the machine-readable instructions such that, when the processor 115 executes the machine-readable instructions, it configures the camera 101 to implement the aforesaid methods in accordance with the invention.

The present invention also provides a method of determining physical position coordinates for a pixel location in the FOV of the camera 101 or in camera image data, the method comprising: identifying or selecting a pixel location in the FOV or camera image data; and transforming said identified or selected pixel location to physical position coordinates for a corresponding physical location in the ROI 117, wherein said transformation is based on a relationship derived from paired pixel locations and measured physical position coordinates for the plurality of reference points 120 in the ROI 117.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine-readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of calibrating a camera comprising the steps of:
    defining an area observed in a field of view (FOV) of the camera as a region of interest (ROI);
    selecting a plurality of physical reference points in said ROI;
    obtaining for each reference point physical position coordinates;
    obtaining from said camera FOV or camera image data pixel locations for each point of reference;
    pairing each pixel location with the physical position coordinates of its respective reference point;
    deriving a relationship from the paired pixel locations and physical position coordinates to enable a selected or identified pixel location in the camera FOV or camera image data to be transformed to physical position coordinates for a corresponding physical location in said ROI;
    selecting or identifying an object in the camera FOV or camera image;
    selecting or identifying a pixel location located centrally of a base of an end of the object which is nearest to the camera; and
    using the derived relationship to transform the pixel location of the object into physical position coordinates in said ROI.

2. The method of claim 1, wherein the plurality of physical reference points in said ROI comprises at least four reference points and preferably as many as thirty reference points.

3. The method of claim 2, wherein the reference points are at different positions within the ROI and/or do not lie on a same line within the ROI.

4. The method of claim 1, wherein the derived relationship comprises a homography matrix for transforming the selected or identified pixel location in the camera FOV or camera image data to said physical position coordinates for said corresponding physical location in said ROI.

5. The method of claim 1, wherein the plurality of reference points are evenly distributed throughout the ROI and/or are positioned as far away as possible from each other within the ROI.

6. The method of claim 1, wherein the ROI is defined as a flat area in the FOV of the camera where it is desired to obtain accurate physical positions of observed objects.

7. The method of claim 1, wherein the method includes obtaining for each reference point absolute physical position coordinates.

8. The method of claim 1, wherein the camera has a fixed FOV.

9. The method of claim 1, wherein the method includes placing visual aid objects in the ROI to demarcate the reference points.

10. The method of claim 1, wherein the method includes taking a separate image for each reference point.

11. The method of claim 1, wherein the method includes, prior to the step of deriving a relationship, the steps of:
    selecting a subset of four or more paired pixel locations and physical position coordinates;
    selecting a subset of four or more of said paired pixel locations and physical position coordinates;
    using said subset to determine if each remaining paired pixel location and physical position coordinates comprises an outlier;

if yes, removing said paired pixel location and physical position coordinates from a set comprising all of said paired pixel location and physical position coordinates; and deriving the relationship from the set comprising all of said paired pixel location and physical position coordinates once all outliers have been removed from said set.

12. The method of claim 4, wherein the method includes, prior to the step of deriving a homography matrix, the steps of:

selecting a subset of four or more paired pixel locations and physical position coordinates;

deriving a homography matrix from said subset of four or more paired pixel locations and physical position coordinates;

using said homography matrix to determine if each remaining paired pixel location and physical position coordinates comprises an outlier;

if yes, removing said paired pixel location and physical position coordinates from a set comprising all of said paired pixel location and physical position coordinates; and recalculating said homography matrix from the set comprising all said paired pixel location and physical position coordinates once all outliers have been removed.

13. The method of claim 12, wherein the method of removing outliers from the set comprising all said paired pixel location and physical position coordinates includes using a threshold to separate outliers from inliers, inliers comprising paired pixel location and physical position coordinates meeting the threshold and thus not removed from the set comprising all said paired pixel location and physical position coordinates.

14. The method of claim 13, wherein the step of recalculating said homography matrix comprises a least squares method which minimizes reprojection errors amongst the inliers.

15. A camera comprising:
a memory storing machine-readable instructions; and
a processor for executing the machine-readable instructions such that, when the processor executes the machine-readable instructions, it configures the camera to:

define an area observed in a field of view (FOV) of the camera as a region of interest (ROI);

receive physical position coordinates for a plurality of physical reference points in said ROI;

obtain from said camera FOV or camera image data pixel locations for each point of reference;

pair each pixel location with the physical position coordinates of its respective reference point;

derive a relationship from the paired pixel locations and physical position coordinates to enable a selected or identified pixel location in the camera FOV or camera image data to be transformed to physical position coordinates for a corresponding physical location in said ROI;

select or identify an object in the camera FOV or camera image;

select or identify a pixel location located centrally of a base of an end of the object which is nearest to the camera; and use the derived relationship to transform the pixel location of the object into physical position coordinates in said ROI.

16. A method of determining physical position coordinates for a pixel location in a field of view (FOV) of a camera or in camera image data, the method comprising:

identifying or selecting a pixel location in the FOV or camera image data; and transforming said identified or selected pixel location to physical position coordinates for a corresponding physical location in a region of interest (ROI), said ROI comprising an area observed by the camera in its FOV;

wherein said transformation is based on a relationship derived from paired pixel locations and measured physical position coordinates for a plurality of reference points in the ROI;

selecting or identifying an object in the camera FOV or camera image;

selecting or identifying a pixel location located centrally of a base of an end of the object which is nearest to the camera; and using the derived relationship to transform the pixel location of the object into physical position coordinates in said ROI.

* * * * *